UNITED STATES PATENT OFFICE.

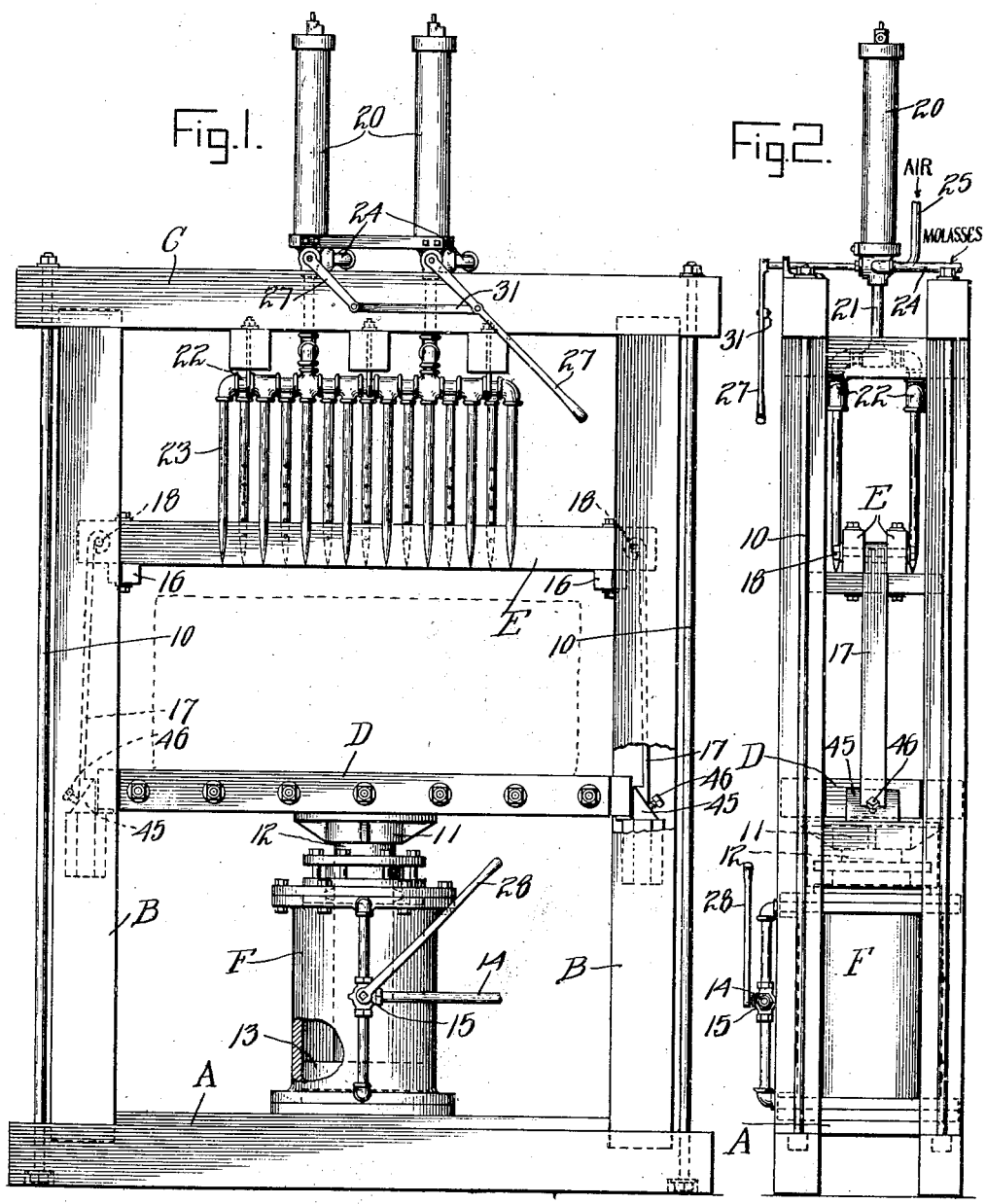

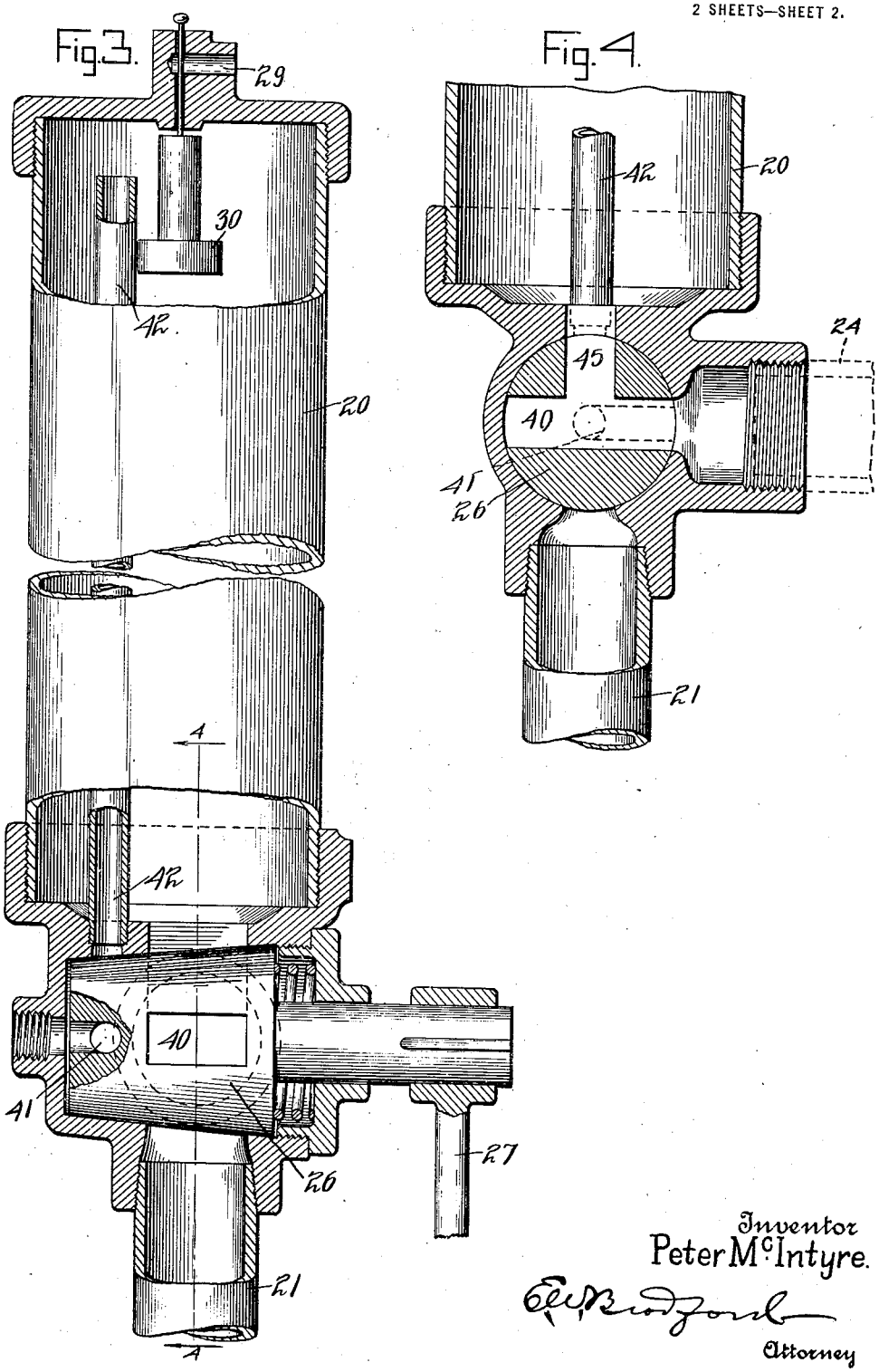

PETER McINTYRE, OF MEMPHIS, TENNESSEE.

APPARATUS FOR PREPARING FEED FOR STOCK.

1,332,629.  Specification of Letters Patent.  Patented Mar. 2, 1920.

Application filed June 30, 1919. Serial No. 307,551.

*To all whom it may concern:*

Be it known that I, PETER MCINTYRE, a citizen of the United States, residing at Memphis, in the county of Shelby and State of Tennessee, have invented certain new and useful Improvements in Apparatus for Preparing Feed for Stock, of which the following is a specification.

The mixing of molasses with feed for stock has heretofore been found of great advantage, by not only improving its palatability and digestive properties, but also by imparting to the feed additional strength and flesh building properties, as well as appetite satisfying properties. Heretofore the methods of mixing molasses with feed have been of rather crude form, in part extemporaneously provided, and practised by the feeder at the point of feeding. Such methods have been unsatisfactory from the standpoint of securing a thorough and uniform mixture as well as from the standpoint of economy in utilizing the molasses. It has been impossible to mix such product with baled feed until the bale is opened and the feed, such as hay, has been loosened up and spread out for the purpose.

The object of my said invention is to provide a method and means for impregnating or saturating baled feed, such as hay, with molasses, or other substance, while in baled condition and in a manner to distribute the substance in a substantially uniform quantity throughout the bale, whereby the cost of preparation is greatly reduced and waste eliminated, all as will be hereinafter more fully described and claimed. Throughout the specification and claims it will be understood that by the term "molasses" I mean molasses or any other substance which is capable of use with the apparatus and desirable to use for such purposes.

Referring to the accompanying drawings which are made a part hereof, and on which similar reference characters indicate similar parts, Figure 1 is a front elevation of an apparatus designed for injecting into a bale of feed product molasses, or any other substance or preparation desired, Fig. 2, an edge elevation of the same, Fig. 3, a detail view partly in elevation on an enlarged scale showing the molasses reservoir and valve for controlling same, and Fig. 4, a detail section on the dotted line 4—4 in Fig. 3.

In said drawings the portions marked A represent the sills, B the uprights, and C the top timbers of the frame of the press; D a lower platen, E an upper platen, or stripper, and F a steam or compressed air cylinder for operating the press.

All of these parts are or may be of any appropriate construction and arrangement and require no special description. The several parts of the frame are rigidly secured together by truss rods 10. It will be understood, of course, that the construction of the frame may be varied to suit conditions or desires.

The platen D is adapted to move in vertical ways between the uprights B, being carried on a piston head 11 connected by a piston rod 12 with a piston 13 in the cylinder F. Said piston is operated by steam or compressed air coming through a pipe 14 and controlled by a valve 15 in the usual manner.

The upper platen, or stripper, E consists of two bars connected by cross members 16 and provided with hooks 17 on each end pivoted on bolts 18 which are adapted to engage under the edge of platen D during the operation, as will be presently described.

On the top of the frame are mounted molasses reservoirs 20 connected by pipes 21, with header pipes 22, said header pipes being spaced apart a distance, as best shown in Fig. 2. A number of downwardly projecting hollow prongs 23 are connected at short intervals with each of said header pipes, said prongs being formed flattened and pointed at their lower ends with a series of perforations on their inner faces, or otherwise perforated as may be found most desirable or appropriate for the purpose.

These prongs are thus distributed a short distance apart for substantially the length of the bale and in rows a short distance apart for substantially the width of the bale so that when inserted in the bale, the prongs are so distributed throughout the body of the bale that no portion thereof is at any considerable distance from one of said prongs. As will be noted in Fig. 1, the prongs on one header are preferably offset, or arranged staggered in relation to those on the adjacent header.

The molasses reservoirs 20 are adapted to contain one charge of molasses or the quantity of molasses which it is desired to inject into each bale of the feed. The reservoirs are filled by means of a molasses inlet pipe 24 and the molasses is ejected by means of compressed air or other means (steam, for example) coming into the upper ends of said reservoirs through supply pipe 25. Both of said pipes connect with the same valve casing and are controlled by a single valve 26 with an operating lever 27 arranged on the same side of the machine as the operating lever 28 for the valve 15, so that both levers are within convenient reach of an operator without changing his position.

The construction of the valve and molasses reservoirs are best seen by reference to Figs. 3 and 4.

Said valve 26 is formed with an ordinary 3-way port as best illustrated in Fig. 4. When turned to the position shown in said figure, the molasses will flow from the supply pipe 24 through ports 40 and 45 into the reservoir 20. As the molasses fills the reservoir, the air will escape through a vent 29, in the top controlled by a float 30. When the molasses reaches said float 30 it raises the float and automatically closes the vent and stops the filling operation. I have shown two reservoirs on the top of the machine both provided with valves of like character and connected by a link 31 so that they operate simultaneously. It will be understood, of course, that any number of reservoirs desired may be provided, all connected in like manner for simultaneous operation through the movement of a single operating lever.

The reservoirs being charged and it being desired to inject the charge into a bale of feed, such as hay, the bale is placed upon the platen D, as indicated by dotted lines in Fig. 1, and the steam or compressed air is turned into cylinder F beneath piston 13, thus forcing said platen D upward and carrying with it the bale of hay thereon. As the top of the bale comes in contact with the platen E said platen also is lifted upwardly, the timbers passing along side the prongs 23, and upward along side the header pipes 22. As soon as the platen E is lifted sufficiently the hooks 17 fall under the ends of the platen D. After the platen D has been raised to bring the bale to the height desired, or to a point where the prongs 23 are properly embedded therein, the valve 26 is turned so that the port 40 will lead from the reservoir straight into the pipe 21 and this, at the same time, brings the compressed air port 41 into communication with a pipe 42 leading to a point above the molasses in the reservoir. The compressed air rushing through said pipe then acts to force the molasses from said reservoir through pipe 21, through headers 22 into the hollow prongs 23 and out through the perforations in said prongs into the body of the bale and, as prongs are substantially equally distributed at frequent intervals throughout the bale, the molasses is forced by said pressure into substantially all the hay, which becomes thoroughly and uniformly saturated or impregnated therewith.

When the charge of molasses has been forced into the bale, valve 15 is turned to throw the pressure above the piston 13 and open the exhaust from below said piston thus carrying platen D downward. The hooks engaging under the end of platen D also carry with it the platen E which serves as a stripper and strips the bale free from the prongs 23. When said platen E reaches the position shown in Fig. 1 the hooks 17, by reason of their inclined points contacting with the inclined surfaces of blocks 45, are thrown out of engagement with the ends of platen D and the points of said hooks resting against stops 46 support platen E in said position while platen D moves farther downward, freeing the bale completely from platen E so that it may be easily removed from the machine and another bale introduced for like treatment.

By this means the bale is thoroughly and uniformly saturated with the molasses and the operation is quickly completed so that it is accomplished at very small expense. The molasses is also confined well within the bale so that the exterior of the bale is practically free of all such substance and can be handled without the inconvenience or disadvantage which would result from having molasses smeared over its exterior. It will be noted that the perforations in the prongs 23 are at points which confine the discharge of the molasses well within the outer surface of the bale.

By this arrangement it is also possible to inject into each bale the exact quantity of molasses desired, the quantity being predetermined by the amount turned into each reservoir 20 from the main supply prior to the treatment of each bale.

Having thus fully described my said invention, what I claim as new and desire to secure by Letters Patents, is:

1. An apparatus for treating baled feed comprising a battery of hollow perforated prongs connected with the molasses supply, means for holding said molasses supply under pressure, means for supporting the bale, power apparatus for operating said means, and means for controlling the supply of molasses to be injected into said bale, substantially as set forth.

2. An apparatus for treating baled feed comprising a battery of hollow perforated prongs connected with a molasses supply under pressure, a reciprocating power operated member adapted to carry the bale to and from said prongs, means for controlling the movement of said power operated member, and means for controlling the discharge of the molasses through said perforated prongs, substantially as set forth.

3. An apparatus for treating baled feed with molasses comprising a frame, a battery of hollow perforated prongs rigidly mounted at the upper portion of said frame, a molasses reservoir connected with said prongs, a molasses supply connected with said reservoir, a compressed air supply also connected with said reservoir, a valve for controlling the molasses supply and the compressed air supply, a movable platen in said frame, a power cylinder for operating said platen, and means for controlling the operation of said cylinder and the operation of the molasses reservoir, substantially as set forth.

4. An apparatus for impregnating baled feed with molasses comprising a frame, molasses reservoirs, a battery of dependent hollow perforated prongs connected by header pipes and branch pipes with said molasses reservoirs, a molasses supply pipe leading into each of said reservoirs, a compressed air supply pipe also leading into each of said reservoirs, valves for controlling said air supply and molasses supply, a platen for carrying a bale of feed mounted to reciprocate vertically in said frame, a power cylinder for operating said platen, a top platen arranged to move along the side of said prongs, a connection between the upper and lower platen, means for disconnecting said connection before the lower platen completes its downward movement, and valves for controlling the power cylinder, all substantially as set forth.

5. An apparatus for impregnating bales of feed with molasses comprising a reciprocating bale-carrying platen, power means for operating said platen, hollow perforated prongs connected with the molasses supply arranged to be inserted in the bale carried by said platen, a molasses reservoir connected with said hollow prongs, a molasses supply leading to said reservoir, a compressed air supply leading to said reservoir, and a single valve for controlling both the molasses inlet, the molasses outlet and the compressed air inlet, substantially as set forth.

6. In an apparatus for impregnating bales of feed with molasses, the combination of hollow prongs adapted to be inserted in the bale, means for inserting said prongs, a molasses reservoir connected with said prongs, a molasses supply pipe leading to said reservoir, a compressed air supply pipe also leading to said reservoir and arranged to discharge above the supply of molasses therein, a float for limiting the inflow of molasses, and a valve formed with ports to control the inflow of molasses, the inflow of the compressed air and the outflow of the molasses, substantially as set forth.

In witness whereof, I have hereunto set my hand and seal at Memphis, Tennessee this 25th day of June, A. D. nineteen hundred and nineteen.

PETER McINTYRE. [L. S.]

Witnesses:
C. L. ROMAN,
JOHN W. FARLEY.